United States Patent [19]

Koumo et al.

[11] Patent Number: 5,079,732

[45] Date of Patent: Jan. 7, 1992

[54] MULTI-FUNCTIONAL ELECTRONIC DESK CALCULATOR

[75] Inventors: Hideyasu Koumo, Yamato-Koriyama; Fumiaki Kawawaki, Shiki; Noboru Akizuki, Nara, all of Japan

[73] Assignee: Sharp Kabushiki Kaisha, Osaka, Japan

[21] Appl. No.: 513,809

[22] Filed: Apr. 24, 1990

[30] Foreign Application Priority Data

Apr. 28, 1989 [JP] Japan .................... 1-50683[U]
Apr. 28, 1989 [JP] Japan .................... 1-50684[U]

[51] Int. Cl.$^5$ .............................................. G06F 3/00
[52] U.S. Cl. ................................................ 364/709.12
[58] Field of Search .............. 364/709.12, 710.11, 364/710.14, 710.07, 705.05, 715.05, 709.01; 341/84

[56] References Cited

U.S. PATENT DOCUMENTS 4,059,750 11/1977 Dickinson et al. ........... 364/709.12
4,695,983 9/1987 Oda et al. ..................... 364/709.12
4,935,889 6/1990 Harada et al. ................. 364/710.14

FOREIGN PATENT DOCUMENTS 52-94751 8/1977 Japan .

OTHER PUBLICATIONS

Programming for the Sciences, Applications for the Sharp EL-512 Scientific Calculator, Sharp Electronics Corporation, 1983, pp. 16, 30–32.

Primary Examiner—Gary V. Harkcom
Assistant Examiner—Long T. Nguyen
Attorney, Agent, or Firm—David G. Conlin; Robert F. O'Connell

[57] ABSTRACT

A multi-functional electronic desk calculator has numeral value keys for inputting a numeral value and a decimal point key for inputting a decimal point. The calculator also has a device for detecting depression of the numeral value keys to produce a first signal representative of being in a numeral value inputting mode, a device for detecting depression of the decimal point key to produce a second signal representative of input of the decimal point, a predetermined single key, and a device for operating the predetermined single key as a key used for inputting hexagesimal number when the first signal is produced and the second signal is not produced, and for operating the predetermined single key as a conversion key for performing conversion from decimal number to hexagesimal number when the first signal is not produced or when the second signal is produced.

15 Claims, 9 Drawing Sheets

| KEY OPERATION | NUMERAL VALUE DISPLAY PORTION | STATE |
|---|---|---|
| [1] [2] [DMS]—22 | 12° | DEGREE INPUT RECOGNITION |
| [3] [4] [DMS]—22 | 12°34' | MINUTE INPUT RECOGNITION |
| [5] [6] [DMS]—22 | 12°34'56. | SECOND INPUT RECOGNITION |
| [7] [8] | 12°34'56.78 | FRACTION INPUT |

Fig.8

| KEY OPERATION | NUMERAL VALUE DISPLAY PORTION | STATE |
|---|---|---|
| [1] [.] [2] [3] [4] | 1.234 | INPUTTING NUMERAL VALUE |
| [DMS] | 1°14'02.40 | CONVERSION TO HEXAGESIMAL NUMBER |

| KEY OPERATION | GUIDANCE DISPLAY PORTION | NUMERAL VALUE DISPLAY PORTION | STATE |
|---|---|---|---|
| [1] [0] [2ndF] [CONV/CNST] | in →? | 10 | UNIT CONVERSION FUNCTION |
| [→rθ ▽ / a] | cm →? | 10 | DURING SEARCH OF UNIT |
| ⋮ | ⋮ | ⋮ | ⋮ |
| [→rθ ▽ / a] | cal →? | 10 | DESIRED UNIT |
| [→] | →J | 41.855 | UNIT CONVERSION EXECUTION |

Fig. 13

| KEY OPERATION | NUMERAL VALUE DISPLAY PORTION | STATE |
|---|---|---|
| [1] [2] [3] | 123 | INPUTTING NUMERAL VALUE |
| [→] | 12 | RIGHT SHIFT FUNCTION (ERASING) |

MULTI-FUNCTIONAL ELECTRONIC DESK CALCULATOR

BACKGROUND OF THE INVENTION

1. Field of the Invention

The present invention relates to a multi-functional electronic desk calculator having various functions as well as ordinary arithmetic four-rules calculation.

2. Description of the Related Art

In a multi-functional electronic desk calculator having various functions, such as a functional calculation, a complex number calculation, a numerical-value integral calculation, statistical calculation, a time calculation and/or a unit conversion as well as four-rules calculation, it is required to reduce the number of keys at a key input portion thereof.

In an electronic desk calculator known by the inventors of the present application, which can perform a time calculation or an angle calculation by inputting a hexagesimal numerical value, a hexagesimal input key and a hexagesimal conversion key are discretely provided in the key input portion together with ten keys, four-rules keys, a decimal-point key and an equal key.

The hexagesimal input key is used for recognizing a hexagesimal number in case that a numerical value inputted through the ten keys is hexagesimal number. For example, when a numerical value of angle is inputted as a hexagesimal number, a numerical value corresponding to the degree portion of the angle is inputted by means of the ten keys, and the input of the degree portion is recognized by depressing the hexagesimal input key. Then, a numerical value corresponding to the minute portion is inputted and the hexagesimal input key is pressed to recognize as the minute portion. Thereafter a numerical value corresponding to the second portion is inputted and the hexagesimal key is depressed.

The hexagesimal conversion key is used in case that a decimal numerical value which was inputted through the ten keys is to be converted into a hexagesimal numerical value.

As mentioned above, in the electronic desk calculator, since the two keys are discretely provided to convert a numerical value into a hexagesimal number, the number of keys increases and operations of the keys become complex causing misoperations.

In an electronic desk calculator having mutual conversion functions for a plurality of units, which is known by the inventors of the present application, two unit-conversion direction selecting keys and a numeral-value erasing key are discretely provided in an input portion thereof in addition to ten keys, four-rules keys, functional keys, a decimal point key, memory statistic keys, a percent key and an equal key.

The ten keys, the four-rules keys, the functional keys, the decimal point key, the memory statistic key, the percent key and the equal key also serve as unit-conversion executing keys respectively. These keys are assigned for units to be converted respectively, and symbols of the assigned units are displayed over, below or on the right sides of the respective keys. For example, for a key of "8", which is one of the ten keys, a symbol of unit conversion such as "in⇌cm" is displayed as well as the numeral value of "8".

One of the two unit-conversion direction selecting keys are depressed when unit conversion of an numeral value inputted through the ten keys is carried out. Either of these keys is selectively depressed in accordance with the direction of the unit conversion. For example, in case that "100" inches is to be converted into a numeral value of centimeter, the numeral value of "100" is inputted through the ten keys at first. Then one of the two unit-conversion direction selecting keys, which indicates the conversion from the left side unit to the right side unit is depressed. Thereafter, the key of "8" among the ten keys, which is also used as a unit-conversion executing key for "in⇌cm", is depressed, thereby obtaining a display of "254" designating the corresponding numeral value of the centimeter unit at a display portion.

While, the numeral-value erasing key is operated when a wrong numeral value is inputted through the ten keys so as to successively erase the lowest digit by shifting the displayed numeral value in the right direction.

In the aforementioned desk calculator, since the two unit-conversion direction selecting keys and the numeral-value erasing key each having a sole function are discretely provided, the number of the keys is increased.

According to the such desk calculator, furthermore, it is necessary that an operator reads symbols displayed above, below or on the right sides of the respective keys used for the unit conversion execution, and the operator must selectively press one of the unit-conversion-direction selecting keys first, then depress the desired unit-conversion executing key. Therefore, operations become complex causing misoperation. Additionally, since information concerning the conversion unit is not displayed at the display portion, the operator does not occasionally notice when misoperations occur.

SUMMARY OF THE INVENTION

It is therefore an object of the present invention to provide a multi-functional electronic desk calculator which can reduce the number of keys at a key input portion thereof.

Another object of the present invention is to provide a multi-functional electronic desk calculator which can guarantee correct and facile operations.

According to the present invention, the above-mentioned objects are attained by a multi-functional electronic desk calculator which includes numeral value keys for inputting a numeral value, a decimal point key for inputting a decimal point, a device for detecting depression of the numeral value keys to produce a first signal representative of being in a numeral value inputting mode, a device for detecting depression of the decimal point key to produce a second signal representative of input of a decimal point, a predetermined single key, and a device for operating the single key as a key used for inputting hexagesimal number when the first signal is produced and the second signal is not produced, and for operating the single key as a conversion key for performing conversion from decimal to hexagesimal when the first signal is not produced or the second signal is produced.

In case that the single key is operated after input of a hexagesimal numeral value through the numeral value inputting keys, since the decimal point is not included in the inputted numeral value, the second signal is not produced, but the first signal is produced because of the numeral value inputting mode. Accordingly, the single key has a function for recognizing the fact that the calculator is operated in the hexagesimal mode and the input of hexagesimal number is actually carried out.

In order to convert an inputted decimal number into hexagesimal number, since a decimal number corresponding to the hexagesimal number has certainly a decimal point, the decimal-point key must be depressed. Accordingly, since the second signal is produced in this case, if the predetermined single key is depressed after input of the numeral value, the single key serves as a conversion key from decimal to hexagesimal.

As described above, according to the present invention, the single key can be served not only as an input key of hexagesimal number but also as a conversion key from decimal to hexagesimal, and the functions of the single key are automatically switched in accordance with a given situation. Thus, the number of keys can be reduced and process with respect to the hexagesimal number can be easily carried out without misoperations.

It is preferred that the calculator according to the present invention further includes functional keys and a device for controlling the first signal not to be produced when the functional keys have been depressed.

It is also preferred that the respective devices are realized by a microcomputer which is operated by control programs.

The above-mentioned hexagesimal number may be a numerical value of angle.

The above-mentioned hexagesimal number may be a numerical value of time.

Furthermore, according to the present invention, the above-mentioned objects can be attained by a multi-functional electronic desk calculator which includes a unit-conversion mode key, a device for detecting depression of the unit-conversion mode key to produce a signal representative of being in a unit-conversion mode, a predetermined single key, and a device for operating the single key as a key for executing unit conversion when the signal is produced and for operating the single key as a key for erasing inputted numeral value when the signal is not produced.

Still furthermore, according to the present invention, the above-mentioned objects can be attained by a multi-functional electronic calculator which includes numeral value keys for inputting a numerical value, a unit-conversion mode key, at least one search key, a device for detecting depression of the unit-conversion mode key to produce a signal representative of being in a unit-conversion mode, a storage device in which a plurality of conversion units are preliminarily stored in a predetermined order, a device for successively displaying the conversion units stored in the storage device in accordance with depression of the search key, a predetermined single key, and a device for operating the single key as a key for executing unit conversion of a numeral value inputted through the numeral value keys based on a conversion unit displayed on the display device when the signal is produced and for operating the single key as a key for erasing the inputted numeral value when the signal is not produced.

In case that the unit-conversion mode key is depressed after input of an numeral value through the numeral value keys, a mode is set to the unit conversion mode and the signal designating this mode is produced. Then, when the search key is depressed, each the conversion unit stored in the storage device in predetermined order is successively read out and displayed at every operation of the search key. An operator depresses the search key by watching the display, and stops the depression of the search key when a conversion unit desired is displayed. Thereafter, the above-mentioned single key is depressed. In this case, since the signal which represents it is in a unit conversion mode is produced, the single key operates as the key for executing unit conversion.

After the input of a numeral value through the numeral-value keys, if the single key is pushed without depressing the unit-conversion mode key, since the signal representative of being in a unit conversion mode is not produced, the single key operates as the key for erasing inputted numeral value. Thus, the lowest digit is successively erased by shifting the inputted numeral value to right.

As aforementioned, according to the present invention, the single key can be served only as a unit-conversion executing key but also as a numeral value erasing key, and automatically switched in accordance with a given situation. Thus, it is possible to carry out the unit conversion by using the only three keys, that is, the unit conversion mode key, the search key and the above-described single key. Accordingly, the number of keys can be reduced and the unit conversion process can be carried out easily without misoperations. Moreover, since each the conversion unit can be selected by displaying it successively owing to the search key, the misoperation by wrong selection of the unit to be converted is never occurred.

It is preferred that the calculator of the present invention further includes a numeral-value display portion for displaying a numeral value inputted in or obtained by a calculation.

While, it is preferred that the calculator also includes a guidance display portion which is separately provided from the numeral-value display portion.

It is also preferred that the guidance display portion is a display portion of a dot-matrix type.

Moreover, it is preferred that the respective devices are realized by a microcomputer which is operated by control program.

Further objects and advantages of the present invention will be more apparent from the following description of the preferred embodiments of the invention as illustrated in the accompanying drawings.

BRIEF DESCRIPTION OF THE DRAWINGS

FIGS. 6, 6A and 6B depict a flow chart diagram to show still another part of the control program for the embodiment of FIG. 1;

DESCRIPTION OF THE PREFERRED EMBODIMENTS

Figure 1:
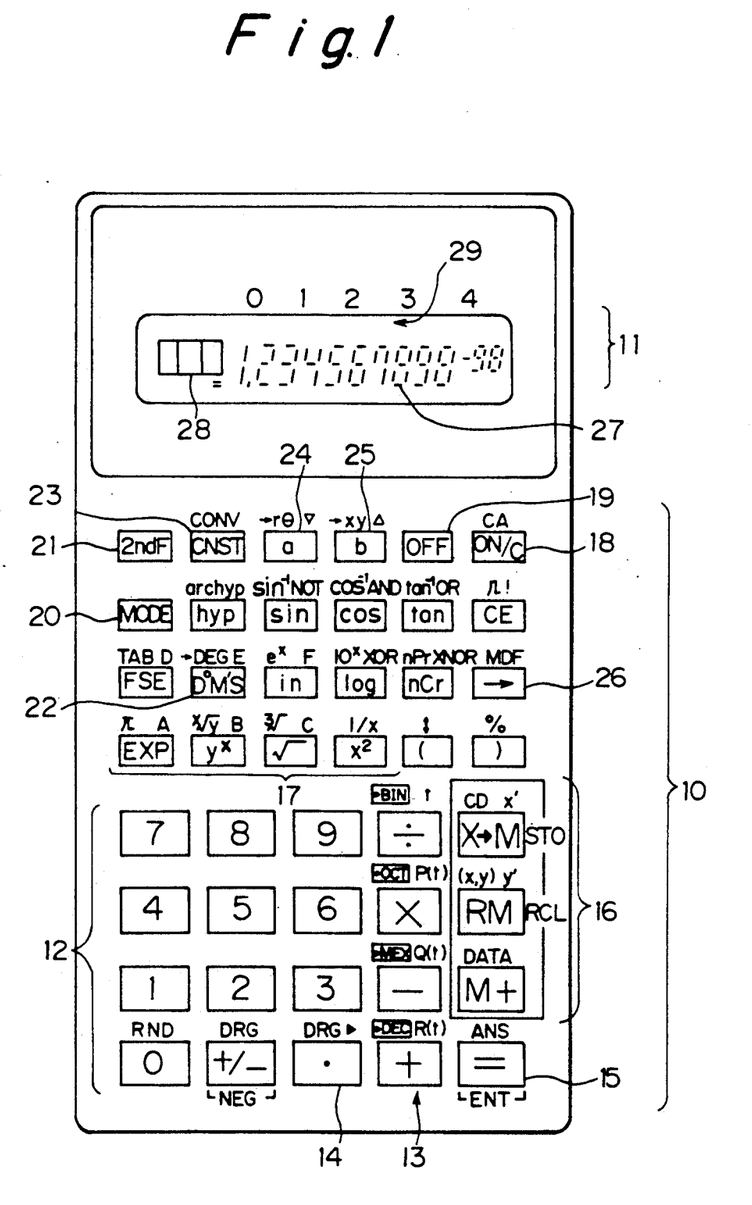
FIG. 1 is a schematic diagram to show a key-input portion and a display portion of a preferred embodiment of a multi-functional electronic desk calculator according to the present invention.

FIG. 1 schematically shows a key input portion and a display portion of a function desk calculator as a preferred embodiment of a multi-functional electronic desk calculator of the present invention.

In FIG. 1, reference numeral 10 designates the key input portion, and 11 the display portion.

In the key input portion 10 are provided ten keys 12, four-rules keys 13, a decimal point key 14, an equal key 15, memory statistic keys 16, function keys 17 for executing various functional calculations, a power-on and erasing key 18, a power-off key 19, a mode selection key 20 for switching various modes, and a second function designating key 21 for switching each function of the keys to a second function displayed over, below, or on the right side of the respective keys.

In the key input portion 10 are further provided a hexagesimal input/conversion key 22 which is used for hexagesimal input and conversion from decimal to hexagesimal, a unit-conversion mode/scientific constant call key 23, a search key 24 for a regular direction shift, a search key 25 for a reverse direction shift, and a unit-conversion executing/numeral-value erasing key 26. In the embodiment, the search key 24 is also used as a key for real-number input during complex number calculation mode and for co-ordinate conversion, and the search key 25 is also used as a key for imaginary-number input during complex number calculation mode and for co-ordinate conversion.

The display portion 11 are provided with a numeral value display portion 27 for displaying an inputted numeral value and a numeral value of a calculation result a guidance display portion 28 for displaying key symbols, marks or various operation guidances, and a symbol display portion 29 for indicating states of various modes.

The display portion 27 has a plurality of display elements arranged in a row, each of which is formed of seven segments. The display portion 28 is formed of a three digits liquid crystal display of a dot-matrix type.

Figure 2:
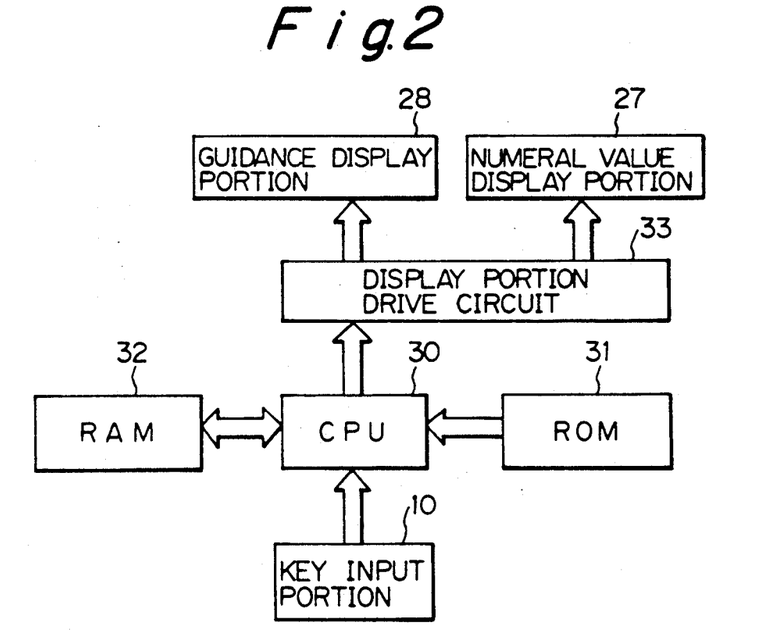
FIG. 2 is a schematic diagram to show constitution of an electric circuit in the embodiment of FIG. 1.

FIG. 2 schematically shows constitution of an electric circuit in the embodiment of FIG. 1.

As shown in the FIG. 2, this embodiment is mainly formed of a microcomputer. A CPU (Central Processing Unit) 30 in the microcomputer controls all the portions of the electronic desk calculator. When input through the respective keys in the key input portion 10 is detected by key scanning, a calculation is executed based on programs and data preliminarily stored in a ROM (Read Only Memory) 31. The result of the calculation is temporarily stored in a RAM (Random Access Memory) 32, then applied to the display portion 27 and the display portion 28 through a display drive circuit 33 and displayed.

Hereinafter, the operation of processes with respect to the hexagesimal number according to this embodiment will be described with reference to FIGS. 3 to 8.

FIGS. 3 to 6 are flow charts respectively showing parts of control programs stored in the ROM 31.

Figure 3:
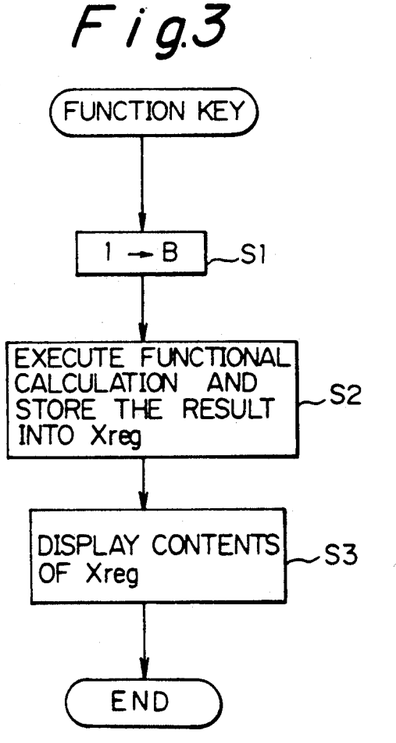
FIG. 3 is a flow chart diagram to show a part of a control program for the embodiment of FIG. 1.

When the function keys 17 are depressed, the program shown in FIG. 3 is executed. At a step S1 in FIG. 3, a flag B is set to "1". The flag B represents whether or not it is in a numeral value inputting mode through the ten keys 12. Namely, the flag B is reset to "0" in the numeral value inputting mode, and is set to "1" in such an operation mode other than the numeral value inputting mode that the function keys 17 are depressed to display an calculation result.

At next step S2, the functional calculation is executed and the result is stored in a temporary storage register Xreg. Then, the contents in the register Xreg are displayed on the display portion 27 at a step S3.

Figure 4:
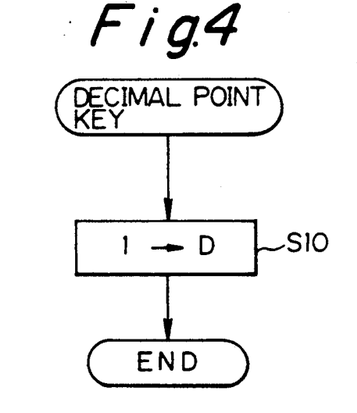
FIG. 4 is a flow chart diagram to show another part of the control program for the embodiment of FIG. 1.

FIG. 4 shows a program executed when the decimal point key 14 is depressed. At a step S10 in FIG. 4, a flag D is set to "1". The flag D represents whether the decimal point key 14 has been depressed or not. The flag D is set to "1" in case that the decimal point key 14 has been depressed, and is reset to "0" in case that the point key 14 has never been depressed even in the numeral value inputting mode.

Figure 5:
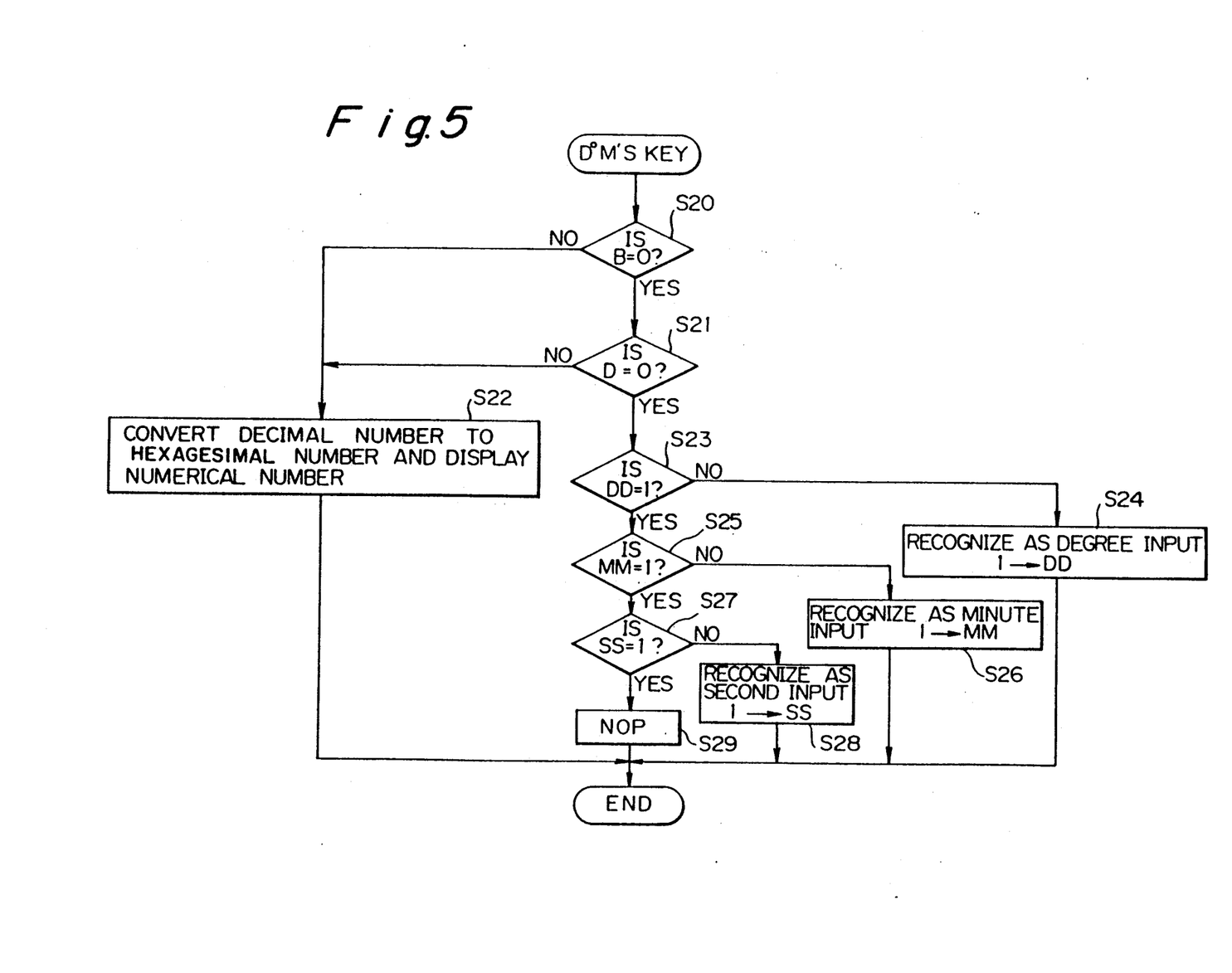
FIG. 5 is a flow chart diagram to show still another part of the control program for the embodiment of FIG. 1.

FIG. 5 shows a program executed when the hexagesimal input/conversion key 22 is depressed. At a step S20 in FIG. 5, it is discriminated whether the flag B is set to "0" or not. If it is "YES", that is, the numeral value inputting mode by depressing the ten keys 12, the program proceeds to a step S21. While the result is "NO", that is, it is not in the numeral value inputting mode, the program proceeds to a step S22.

At the step S21, whether the flag D is "0" or not is discriminated. If it is "YES", that is, the decimal point key 14 has never been depressed, the program proceeds to a step S23. If the result is "NO", that is, the decimal point key 14 has been depressed, the program proceeds to a step S22.

Therefore, in case that the decimal point key 14 was not depressed during the number value inputting mode, the program at steps S23 to S29 for executing an input operation of a hexagesimal number is carried out. In the other case that it is not the numeral value inputting mode or that the decimal point key 14 has been depressed, the program proceeds to the step 22 wherein the conversion operation from the decimal number to the hexagesimal number is carried out. Namely, a decimal numeral value displayed on the display portion 27 is converted into a hexagesimal number, and the converted number is displayed on the display portion 27.

At the step S23, whether a flag DD is "1" or not is discriminated. This flag DD represents whether or not an inputted numeral value of angle was recognized as a degree input. If "NO", the program proceeds to the step S24 wherein the inputted numeral value is recognized as a degree input and the flag DD is set to "1". Contrary to this, if the result is "YES", that is, the degree input was recognized, the program proceeds to the step S25.

At the step S25, whether a flag MM is "1" or not is discriminated. This flag MM represents whether or not an inputted numeral value of angle was recognized as minute input. If "NO", the program proceeds to the step S26 wherein the inputted numerical value is recognized as a minute input and the flag MM is set to "1". If the result is "YES", that is, the minute input was recognized, the program proceeds to the step S27.

At the step S27, whether a flag SS is "1" or not is discriminated. This flag SS represents whether or not an inputted numeral value of angle was recognized as a second input. If "NO", the program proceeds to the step S28 wherein the inputted numeral value is recognized as a second input and the flag SS is set to "1". Then, a possible fraction input is waited. If the result is "YES", that is, the second input is recognized, the program proceeds to the step S29 of no operation.

Figure 6A:
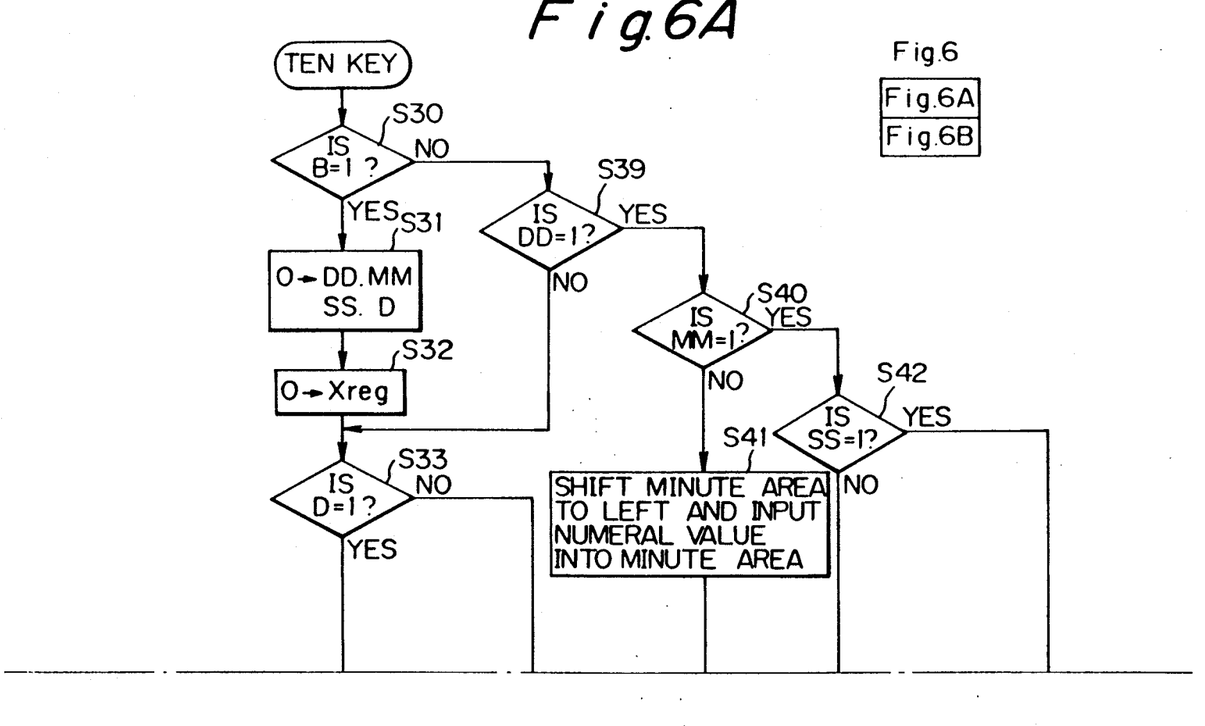
Figure 6B:
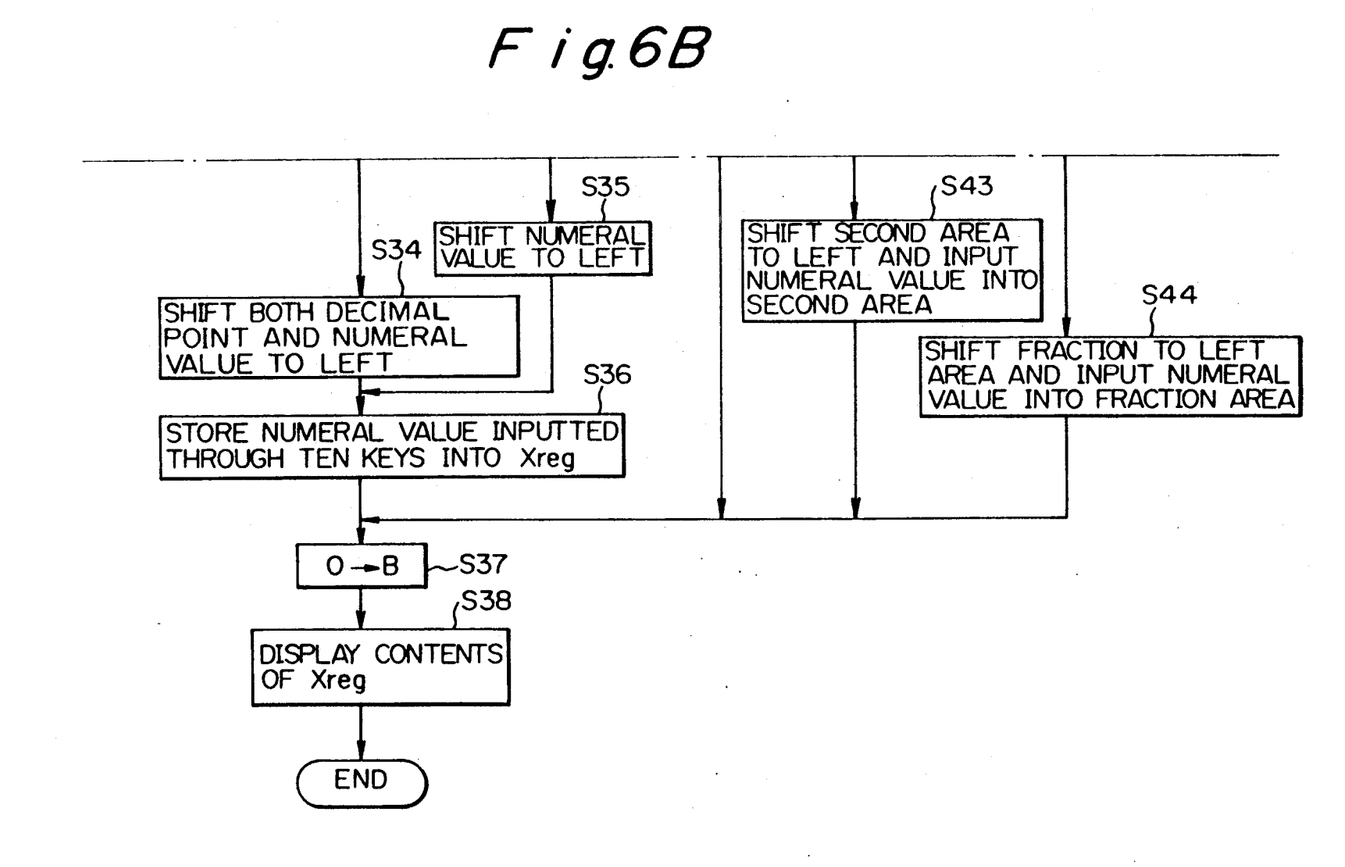

FIG. 6 combined by FIG. 6A and FIG. 6B shows a program executed when the ten keys 12 are depressed.

At a step S30 in FIG. 6, whether the flag B is "1" or not is discriminated. If the discrimination result is "YES", that is, if it is not in the numeral value inputting mode, for example, on the way of displaying a calculated result, the program proceeds to a step S31 so as to reset the respective flags DD, MM, SS and D to "0". Then, at a step S32, the content stored in the temporary storage register Xreg is set to "0".

At the next step S33, it is discriminated whether the flag D is "1" or not. If "YES", that is, the decimal point key 14 has been depressed, the program proceeds to a step S34 wherein both the decimal point and a numeral value are shifted to left. If the result is "NO" at the step S33, that is, the decimal point key 14 has never been depressed, the program jumps to a step S35 wherein only the numeral value is shifted to left.

At the next step S36, a numeral value inputted by depressing the ten keys 12 is stored in the register Xreg. Then, the flag B is reset to "0" at a step S37, and the content stored in the register Xreg is displayed on the display portion 27 at a step S38.

If it is "NO" at the step S30, that is, the flag B is "0", the program jumps to a step S39 so as to discriminate whether the flag DD is "1" or not.

At the step S39, if "NO", that is, the degree input is not recognized, the program proceeds to the above-mentioned step S33. If "YES" at the step S39, that is the degree input is recognized, the program jumps to a step S40 so as to discriminate whether the flag MM is "1" or not.

At the step S40, if "NO", that is, the minute input is not recognized, the program proceeds to a step S41, wherein an area corresponding to minute is shifted to left so as to insert an inputted numeral value into the shifted minute area. Thereafter the program goes to the above-mentioned step S37. If "YES" at the step 40, that is, the minute input is recognized, the program jumps to a step S42 to discriminate whether the flag SS is "1" or not.

At the step S42, if "NO", the program proceeds to a step S43 wherein an area corresponding to second is shifted to left so as to insert an inputted numeral value into the shifted second area. Thereafter the program proceeds to the step S37. If "YES" at the step 42, that is, the second input is recognized, the program proceeds to a step S44 wherein an area corresponding to fractions is shifted to left so as to insert an inputted value into the shifted fraction area. Thereafter the program goes to the step S37.

Figure 7:
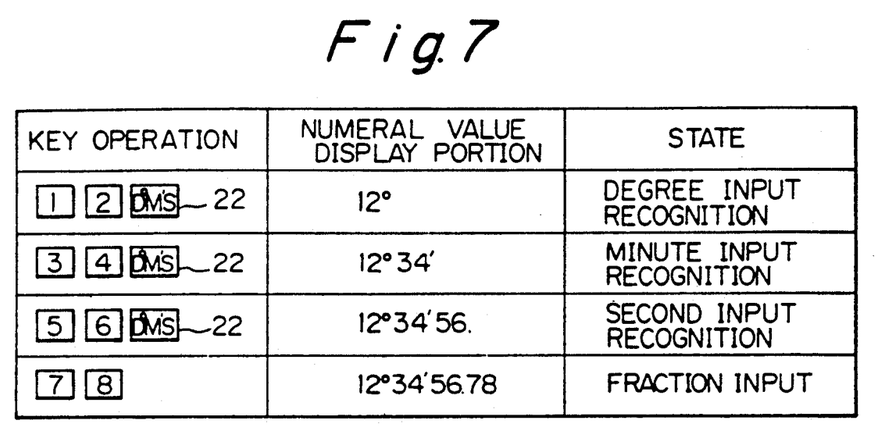
FIG. 7 shows an example of key operations when the hexagesimal number is inputted in the embodiment of FIG. 1.

Referring to FIG. 7 which shows an example of key operations when the hexagesimal number is inputted actual key operations will be explained.

Supposed that an angle of 12 degrees 34 minutes 56 seconds 78 of hexagesimal is inputted.

First, the ten keys 12 are depressed to input "12", then the hexagesimal input/conversion key 22 is depressed. As mentioned above, the key 22 functions as a hexagesimal inputting key in this case. Therefore, the degree input is recognized and thus "12°" is displayed on the display portion 27.

Next, the ten keys 12 are depressed to input "34", then the key 22 is depressed. As the result, the minute input is recognized, and "12°34'" is displayed on the display portion 27.

Thereafter, the ten keys 12 are depressed to input "56", then the key 22 is depressed. Thus, the second input is recognized, and "12°34'56." is displayed on the display portion 27.

Finally, the ten keys 12 are depressed to input "78", and thus "12°34'56.78" is displayed on the display portion 27.

Figure 8:
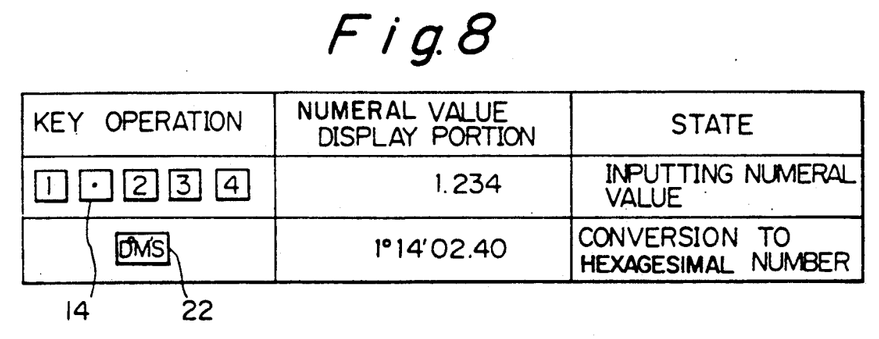
FIG. 8 shows an example of key operations when the conversion from decimal to hexagesimal is carried out in the embodiment of FIG. 1.

FIG. 8 shows an example of key operations when the conversion from decimal to hexagesimal.

When the ten keys 12 and the decimal point key 14 are depressed to input "1.234", the numeral value is displayed at the display portion 27. Then the hexagesimal input/conversion key 22 is depressed. In this case, since the key 22 functions as a conversion key from decimal to hexagesimal, the numeral value displayed on the display portion 27 is converted into a hexagesimal numeral value of "1°14'02.40", and then the converted numeral value is displayed on the display portion 27.

In the above explanations, processes with respect to the hexagesimal number of angle are described. However, in the present invention, it is also possible to carry out process of hexagesimal number of time. In the latter case, units of hour, minute and second are used in place of degree, minute and second.

Hereinafter, the operation of processes with respect to unit conversion according to the present embodiment will be described by using FIGS. 9 to 13.

Figure 9:
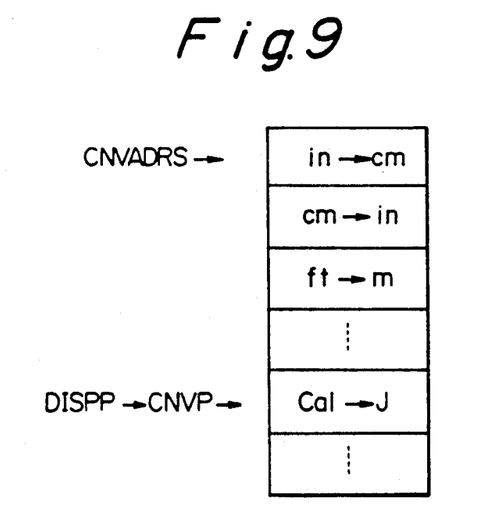
FIG. 9 schematically shows a part of conversion units in a storage area and addresses thereof.

FIG. 9 schematically shows a part of conversion units stored in advance in a storage area in the ROM 31 and addresses thereof. In FIG. 9, reference character CNVADR designates a forefront address, CNVP an address pointer representative of an address of a conversion unit called last, and DISPP a display pointer representative of an address of a conversion unit presently displayed.

Figure 10:
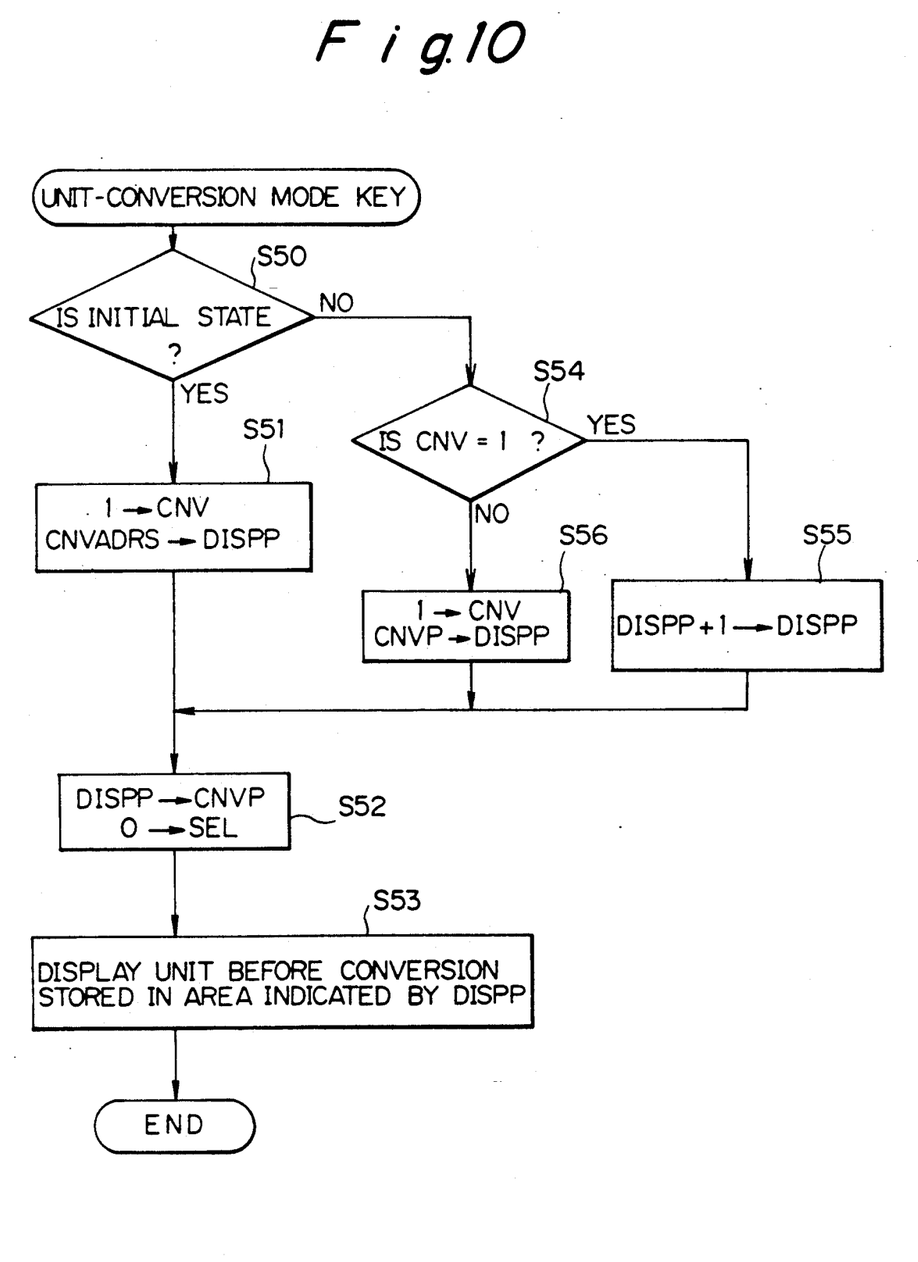
FIG. 10 shows a flow chart diagram to show a part of a control program for the embodiment of FIG. 1.
Figure 11:
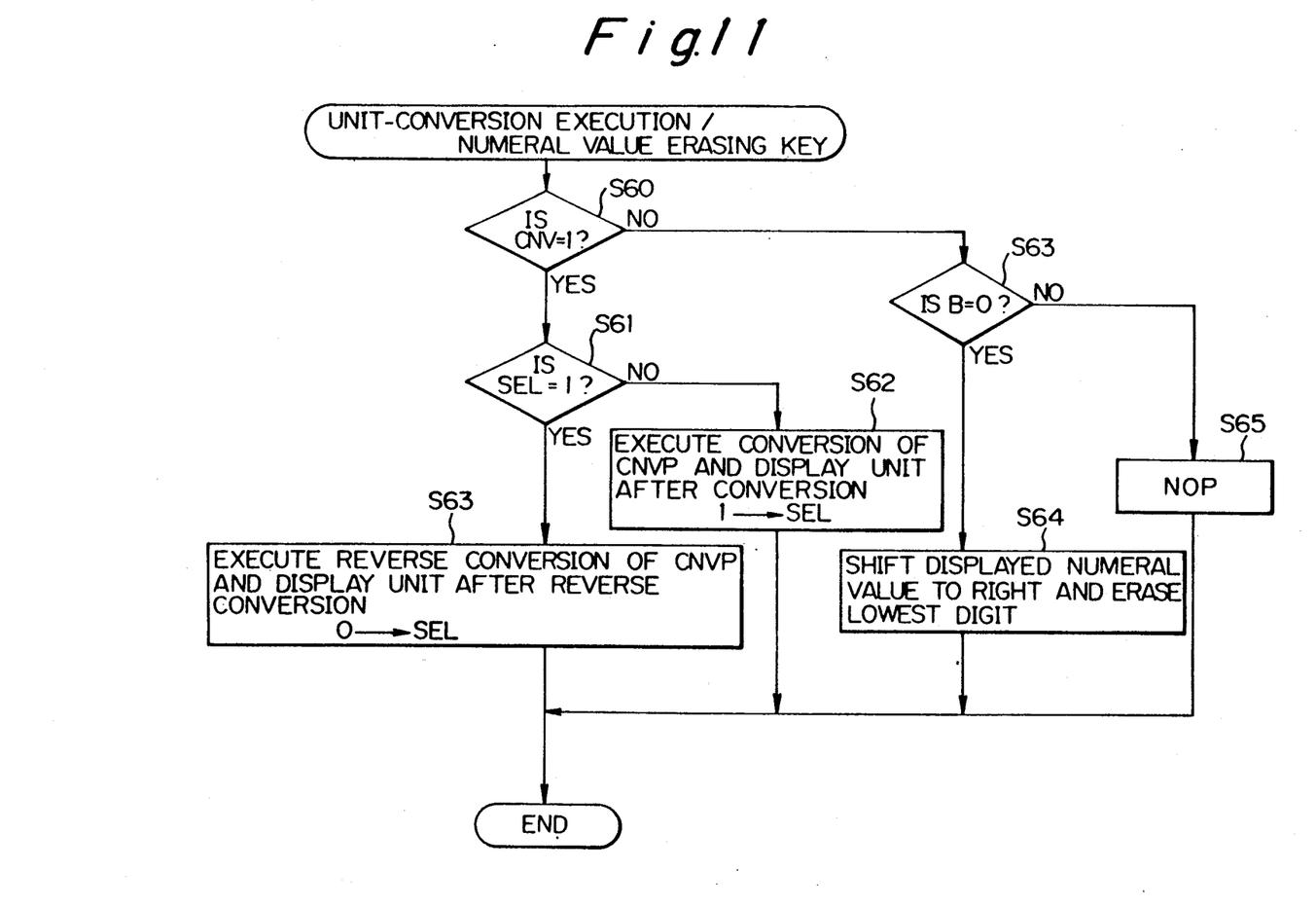
FIG. 11 shows a flow chart diagram to show another part of the control program for the embodiment of FIG. 1.

FIGS. 10 and 11 respectively show flow charts of parts of control programs preliminarily stored in the ROM 31.

In order to execute the unit conversion, a numeral value is inputted by depressing ten keys 12, then the second function designating key 21 and the unit-conversion mode/scientific constant call key 23 are successively depressed. By depressing the key 21, the key 23 functions for a unit conversion mode key.

FIG. 10 shows a program executed when the unit-conversion mode key 23 is pressed. At a step S50 in FIG. 10, it is discriminated whether this key 23 is depressed for the first time after the last resetting, that is, whether the unit-conversion mode is in an initial state or not.

If the discrimination result is "YES", that is, it is in initial state, the program proceeds to a step S51 wherein a unit-conversion mode flag CNV is set to "1" so that the mode becomes the unit-conversion mode. At the step S51, furthermore, the forefront address CNVADRS of the conversion unit storage area is transmitted to the display pointer DISPP. At the next step S52, an address indicated by the display pointer DISPP is transmitted to the address pointer CNVP, and a selection flag SEL for designating whether the unit conversion is really carried out or not is set to "0".

Then, at a step S53, a unit before conversion stored in an area indicated by the display pointer DISPP is displayed on the guidance display portion 28.

At the step S50, if it is discriminated that the key 23 is depressed once or more after the last resetting operation, that is, it is not in initial state, the program jumps to a step S54 so as to discriminate whether the flag CNV is set to "1" or not.

If the discrimination result is "YES", that is, the key 23 was successively depressed, the program proceeds to a step S55. At the step S55, the contents of the display pointer DISPP is incremented and, thereafter the program proceeds to the step S52. As the result, a unit stored in next address is read out and displayed on the guidance display portion 28.

If the result is "NO" at the step S54, the program proceeds to a step S56 wherein the unit-conversion mode flag CNV is set to "1". Then, the contents in the address pointer CNVP is inputted into the display pointer DISPP, and thereafter the program goes to the step S52. As the result, a unit called last is read out and displayed at the display portion 28. This means that if the key 23 is depressed while any unit is not displayed, a unit called for the last unit conversion mode is displayed on the display portion 28.

FIG. 11 shows a program executed when the unit conversion execution/numeral value erasing key 26 is depressed.

At a step S60 in FIG. 11, it is discriminated whether the flag CNV is set to "1" or not.

If it is "YES", that is, the key 26 is depressed during the unit-conversion mode, the program proceeds to a step S61, and it is discriminated whether the selection flag SEL is set to "1" or not.

If the discrimination result at the step S61 is "NO", that is, the unit conversion has never been executed yet, the program proceeds to a step S62 wherein unit conversion stored in an address indicated by the address pointer CNVP is executed, and then the converted result is displayed on the display portion 27, at the same time, a unit after conversion is displayed on the guidance display portion 28. Furthermore, at the step S62, the selection flag SEL is set to "1".

If the discrimination result at the step S61 is "YES", that is, the unit conversion has already been executed, the program proceeds to a step S63. Such a state occurs in case that the key 26 is depressed after the unit conversion was once executed. In this case, reverse conversion of the same unit to the result obtained at the step S62 is executed and the resultant numeral value is displayed on the display portion 27, at the same time, a unit after the conversion is displayed on the guidance display portion 28. Thereafter, the selection flag SEL is reset to "0".

If the discrimination result at the step S60 is "NO", that is, the key 26 is depressed in a mode other than the unit-conversion mode, the program jumps to the step S63 wherein whether the flag B is "0" or not is discriminated.

As aforementioned, the flag B indicates whether the mode now operating is the numeral value inputting mode through the ten keys 12. The flag B is reset to "0" in the numeral value inputting mode, while is set to "1" in such a state other than the numeral value inputting mode that the function keys 17 are depressed and the calculated results are displayed.

In case that the flag B is "YES", the program proceeds to a step S64 wherein a numeral value displayed at the display portion 27 is shifted to right so as to successively erase the lowest digit of the numeral value. If it is "NO" at the step S63, the program proceeds to a no-operation step S65.

Thus, when a numeral value is inputted in a state other than the unit-conversion mode, the key 26 is functions for erasing an inputted numeral value.

Figure 12:
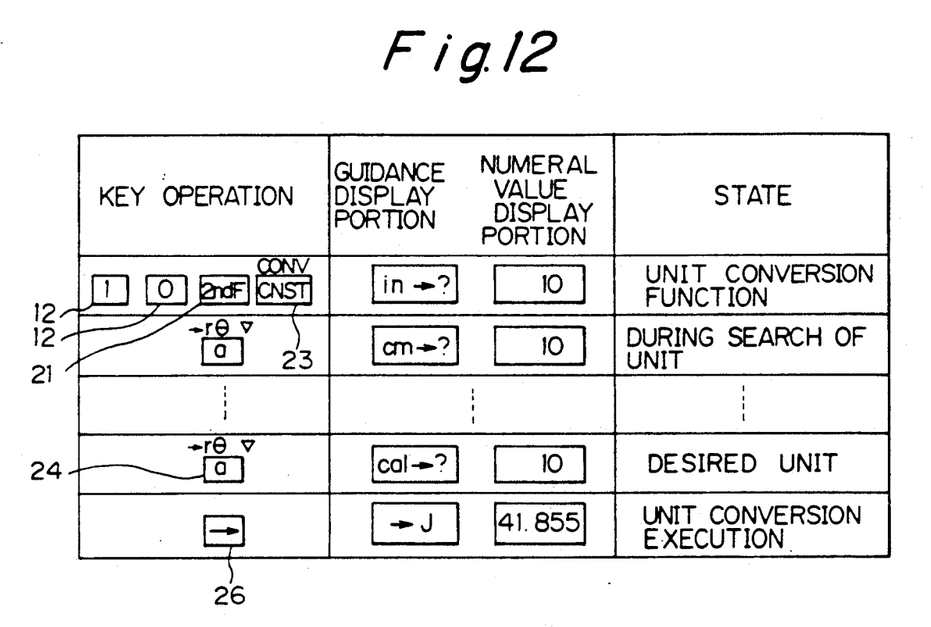
FIG. 12 shows an example of key operation when the unit conversion is carried out in the embodiment of FIG. 1.

Referring to FIG. 12 which shows an example of key operations when the unit conversion is carried out, actual key operations will be explained.

Following explanation will be done for converting "10" expressed on the unit of calorie, "cal", into the unit of joule, "J".

First the numeral value of "10" is inputted through the ten keys 12, then the second function indication key 21 and the unit-conversion mode/scientific constant call key 23 are successively depressed. As mentioned above, the key 23 functions for inducing the unit conversion mode. Therefore, operation becomes the unit conversion mode, the unit of inch, "in", at the forefront address is displayed at the guidance display portion 28, then the inputted numeral value of "10" is displayed at the display portion 27.

Since the unit of inch is not the desired unit, the search key 24 is repeatedly depressed or a repeat function thereof is worked by continuously pushing the key 24, thereby the stored units are successively read out and displayed on the guidance display portion 28. Then, when the desired unit of inch "in", is displayed, the depression of the search key 24 is stopped, and the key 26 is depressed.

As the result, the unit conversion is executed, then a numeral value of "41.855" is displayed at the numeral value display portion 27, at the same time, the unit of joule, "J", after the conversion is displayed at the guidance display portion 28.

Figure 13:
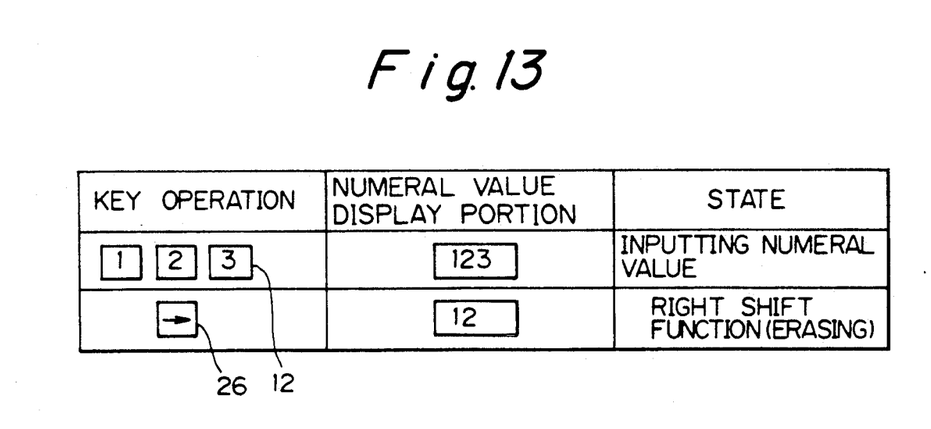
FIG. 13 shows an example of key operations when the inputted numeral-value is erased in the embodiment of FIG. 1.

FIG. 13 shows an example of key operations when the numeral value erasing process is carried out.

First, a numeral value of "123" is inputted through the ten keys 12, then the key 26 is depressed, so that the inputted numeral value is shifted to right and the lowest digit thereof is successively erased. As a result, a numeral value of "12" is displayed on the display portion 27.

Many widely different embodiments of the present invention may be constructed without departing from the spirit and scope of the present invention. It should be understood that the present invention is not limited to the specific embodiments described in the specification, except as defined in the appended claims.

What is claimed is:

1. A multi-functional electronic desk calculator comprising:
   numeral value keys for inputting a numeral value;
   a decimal point key for inputting a decimal point;
   a first detection means, coupled to said numeral value keys, for detecting depression of said numeral value keys to produce a first signal when the depression is detected;
   a second detection means, coupled to said decimal point key, for detecting depression of said decimal point key to produce a second signal when the depression is detected;
   a predetermined single key; and
   means, coupled to said predetermined single key and to said first and second detection means, for recognizing said predetermined single key as a key indicating hexagesimal number inputting mode when the first signal is applied from said first detection means and the second signal is not applied from said second detection means, and for recognizing said predetermined single key as a conversion key for performing conversion from decimal number to hexagesimal number when the first signal is applied from said first detection means and the second signal is applied from said second detection means.

2. A calculator as claimed in claim 1, wherein said calculator further comprises functional keys and means, coupled to said functional keys, to said first detection means, and to said recognition means, for preventing the first signal produced by said first detection means from being applied to said recognition means when said functional keys have been depressed.

3. A calculator as claimed in claim 1, wherein said hexagesimal number is a numeral number of angle.

4. A calculator as claimed in claim 1, wherein said hexagesimal number is a numeral number of time.

5. A calculator as claimed in claim 1, wherein said calculator further comprises calculation means connected to said numeral value keys for providing numeral values in response to the depression of said numeral value keys; and display means connected to said calculation means and comprising a number-value display portion for displaying number values inputted through said numeral value keys.

6. A calculator as claimed in claim 5, wherein said display means further comprises a guidance display portion which is separately provided from said numeral-value display portion.

7. A calculator as claimed in claim 6, wherein said guidance display portion includes a display portion of a dot-matrix type.

8. A multi-functional electronic desk calculator comprising:
   numeral value keys for inputting a numeral value;
   a unit-conversion mode key;
   a first detection means, coupled to said numeral value keys, for detecting depression of said numeral value keys to produce a first signal when the depression is detected;
   a second detection means, coupled to said unit-conversion mode key, for detecting depression of said unit-conversion mode key to produce a second signal when the depression is detected;
   a predetermined single key; and
   means, coupled to said predetermined single key, to said numeral value keys, and to said first and second detection means, for recognizing said predetermined single key as a key for executing unit conversion when the second signal is applied from said second detection means and for recognizing said predetermined single key as a key for erasing a numeral value inputted through said numeral value keys when the first signal is applied from said first detection means.

9. A calculator as claimed in claim 8, wherein said calculator further comprises calculation means connected to said numeral value keys for providing numeral values in response to the depression of said numeral value keys; and
   display means connected to said calculator means and comprising a numeral-value display portion for numeral values inputted through said numeral value keys.

10. A calculator as claimed in claim 9, wherein said display means further comprises a guidance display portion which is separately provided from said numeral-value display portion.

11. A calculator as claimed in claim 10, wherein said guidance display portion includes a display portion of a dot-matrix type.

12. A multi-functional electronic desk calculator comprising:
   numeral value keys for inputting a numeral value;
   a unit-conversion mode key;
   at least one search key;
   a first detection means, coupled to said numeral value keys, for detecting depression of said numeral value keys to produce a first signal when the depression is detected;
   a second detection means, coupled to said unit-conversion mode key, for detecting depression of said unit-conversion mode key to produce a second signal when the depression is detected;
   a storage means for preliminarily storing a plurality of conversion units in a predetermined order;
   means, coupled to said search key and to said storage means, for successively displaying the conversion units stored in said storage means in accordance with depression of said search key;
   a predetermined single key; and
   means, coupled to said predetermined single key, to said numeral value keys, to said display means, and to said first and second detection means, for recognizing said predetermined single key as a key for executing unit conversion of a numeral value inputted through said numeral value keys based on a conversion unit displayed on said display means when the second signal is applied from said second detection means and for recognizing said predetermined single key as a key for erasing a numeral value inputted through said numeral value keys when the first signal is applied from said first detection means.

13. A calculator as claimed in claim 12, wherein said display means comprises a numeral-value display portion for displaying a numeral value inputted through said numeral value keys.

14. A calculator as claimed in claim 13, wherein said display means further comprises a guidance display portion which is separately provided from said numeral value display portion.

15. A calculator as claimed in claim 14, wherein said guidance display portion includes a display portion of a dot-matrix type.

* * * * *